Oct. 14, 1947.  W. P. ALBERT  2,428,770
AUTOMATIC DEAD RECKONING DEVICE
Filed Sept. 7, 1944  2 Sheets-Sheet 1

FIG. 1

INVENTOR
W. P. ALBERT
BY
P. C. Smith
ATTORNEY

Oct. 14, 1947.　　　W. P. ALBERT　　　2,428,770
AUTOMATIC DEAD RECKONING DEVICE
Filed Sept. 7, 1944　　　2 Sheets-Sheet 2

Patented Oct. 14, 1947

2,428,770

UNITED STATES PATENT OFFICE 2,428,770

AUTOMATIC DEAD-RECKONING DEVICE

Walter P. Albert, Madison, N. J., assignor to Bell Telephone Laboratories, Incorporated, New York, N. Y., a corporation of New York Application September 7, 1944, Serial No. 552,981

7 Claims. (Cl. 235—61)

This invention relates to an air position indicator for use on an aircraft for enabling the pilot or navigator to determine at any instant the latitude and longitude of his position and the air miles he has flown from any specified take-off point.

More particularly, the invention is concerned with the provision of electrical equipment for controlling indicators which continuously indicate the aircraft position in degrees and minutes of latitude and longitude and the air miles which have been flown. The utility of apparatus of this character is quite evident. On ships the problem of determining the ship's position at any instant is not difficult due to the slow speed at which surface ships sail and due to the fact that such ships always carry a navigator as a member of the crew who has ample time to make celestial observations, to do the navigational plotting that is necessitated from the data secured from such observations and to keep the necessary records of course and speed to enable a dead-reckoning position to be always known. However, aircraft and particularly airplanes which have high cruising speeds present a more difficult problem for solving navigational data to determine positions. This is particularly true of airplanes of the high speed type which may not have space to accommodate a navigator as part of the crew. Furthermore, in aerial navigation under war conditions evasive action involves such frequent changes of course and speed that a navigator cannot keep an accurate log from which the dead-reckoning position may be obtained. The apparatus which is the subject of this invention may be described as an automatic dead-reckoning device.

Most modern airplanes are provided with a source of 400-cycle 26-volt alternating current for the operation of remote controlled instruments and with a source of 26-volt direct current. However, some types of airplanes, while having a source of 26-volt direct current, do not have a source of 400-cycle alternating current and other types of planes which are provided with such an alternating current source do not have a source of adequate capacity to carry the extra load which would be imposed thereon by the installation of air position indicator apparatus of the alternating current type. It is therefore one object of the present invention to provide apparatus operative by direct current which will continuously indicate the latitude and longitude of the air position of the airplane in which it is installed and the number of air miles flown.

It is a further object of the invention to provide in such an air position indicator apparatus, remote control circuits whereby the indicating instruments may be so compactly assembled that they may be mounted on the instrument panel of an airplane and whereby the circuits and apparatus for controlling such instruments may be located remotely therefrom in any location in the airplane where mounting space is available.

To attain these objects, apparatus has been designed in two parts, an indicating unit and a control unit. Most modern airplanes are equipped with an air mileage unit and with either a remote control earth inductor compass known as a "flux gate" compass or a remote control magnetic compass known as a "magnesyn" compass. From these units information may be secured concerning the air speed and the true compass course of the airplane flight for enabling the control unit to control the indicator unit. The indicator unit may be of the type disclosed schematically in the application Serial No. 527,999 of W. H. T. Holden, filed March 24, 1944, or may be of the type disclosed in the application Serial No. 538,529 of W. H. T. Holden, filed June 2, 1944. The indicator unit is provided with three indicators of the counting wheel type, one of which is controlled to indicate the air miles flown, the second of which indicates the degrees and minutes of latitude of the instant position of the airplane and the third of which indicates the degrees and minutes of the longitude of the instant position of the airplane. A compass rose and pointer may also be provided for indicating the true compass course of the flight. Provision is made for enabling the latitude and longitude indicators to be reset to indicate the latitude and longitude of the position of the airplane at some known point, as for example, at the take-off of a flight and with means for enabling the indicators to be operated in one or the other direction dependent on whether the flight is being conducted in the north or south hemisphere or east or west of a particular reference meridian.

In order that the indicator unit may be sufficiently compact so that it may be mounted in the usual instrument panel in front of the pilot, each indicator is arranged to be operated by a stepping mechanism individual thereto, the stepping mechanisms associated with the latitude and longitude indicators being operable to advance the indicators step-by-step in one or the other direction. The stepping mechanism associated with the air miles indicator is effective to advance such indicator in but one direction of rotation.

The control unit comprises a latitude impulse generator, a longitude impulse generator and a secant variator for varying the number of impulses delivered from the longitude impulse generator to the longitude indicator. The latitude and longitude generators each comprises a drum having twelve triangularly shaped conducting segments embedded in the insulating surface thereof and arranged in two circumferential series as disclosed by the development of the drum surface disclosed in Fig. 3. These drums are both rotated at a speed commensurate with the air speed of the flight through a reduction gear box from the air mileage unit of the airplane. For engagement with each of these drums, three brushes are provided two of which are fixed and engage continuously with the two series of conducting segments respectively and serve as take-off brushes and the third of which is movable axially along the surface of the drum.

The movable brushes of the latitude and longitude impulse generators are movable axially along the surfaces of the drums by Scotch yokes which are driven by a servo-motor operable in accordance with the true compass course of the flight. Through one Scotch yoke, the movable brush of the latitude impulse generator is advanced axially along the drum in accordance with the cosine of the true course angle and through the other Scotch yoke the movable brush of the longitude impulse generator is advanced axially along the surface of the drum in accordance with the sine of the true course angle. Interposed in the circuits extending to the movable brush of each impulse generator is a pair of contacts operable by a cam driven through step-up gearing having a ratio of 1 to 60 from the associated drum driving shaft whereby the contacts are closed sixty times during each revolution of the drum. Because of the arrangement of the conductive segments of each drum, the movement of the movable brush and the cam operated contacts, it is possible to generate from one to sixty impulses during each revolution of the drum, dependent upon the position of the movable brush, and the generated impulses may be transmitted over one or the other of the fixed take-off brushes dependent upon whether the movable brush is advanced into engagement with one or the other series of conducting segments.

In response to the rotation of the drum of the latitude impulse generator at a speed commensurate with the air speed of the airplane flight, and the movement of the movable brush associated with such drum axially along the surface of the drum to an amount commensurate with the cosine of the true compass course of the flight, the latitude impulse generator generates impulses in accordance with changes in the latitude of the flight course and transmits such impulses to the latitude indicator.

Also rotatable by step-up gearing from the shaft of the longitude impulse generating drum is a secant variator having a specially contoured conducting segment embedded in the insulating surface of its drum, a fixed brush engaging the conducting segment for connecting one terminal of the direct current power source to such segment and a brush movable axially along the drum to an amount commensurate with the indicated latitude of the instant position. The movable brush is connected over the cam operated contacts associated with the longitude impulse generator with the movable brush of such generator so that due to the movement of the brush and the rotation of the drum of the secant variator, the rotation of the longitude impulse generator drum at a speed commensurate with the air speed of the airplane flight and the movement of the movable brush associated with the latter drum axially along the surface thereof to an amount commensurate with the sine of the true compass course of the flight, the longitude impulse generator generates impulses in accordance with changes in the longtiude of the flight course and transmits such impulses to the longitude indicator.

Through an additional reduction gear box, the air mileage unit of the airplane is also effective to cause the closure of a pair of cam-operated contacts once for each nautical mile flown to transmit impulses to the air mileage indicator.

The servo-motor for operating the Scotch yoke is also effective through telemetric control to operate the true compass course indicator of the indicating instrument and is controlled from a "flux gate" compass control unit through a compass servo amplifier and detector circuit in a well-known manner as will hereinafter be described.

For a clearer understanding of the invention and the mode of its operation, reference may be had to the following detailed description thereof when read in connection with the accompanying drawings in which.

Figures 2, 3, 4, 5:
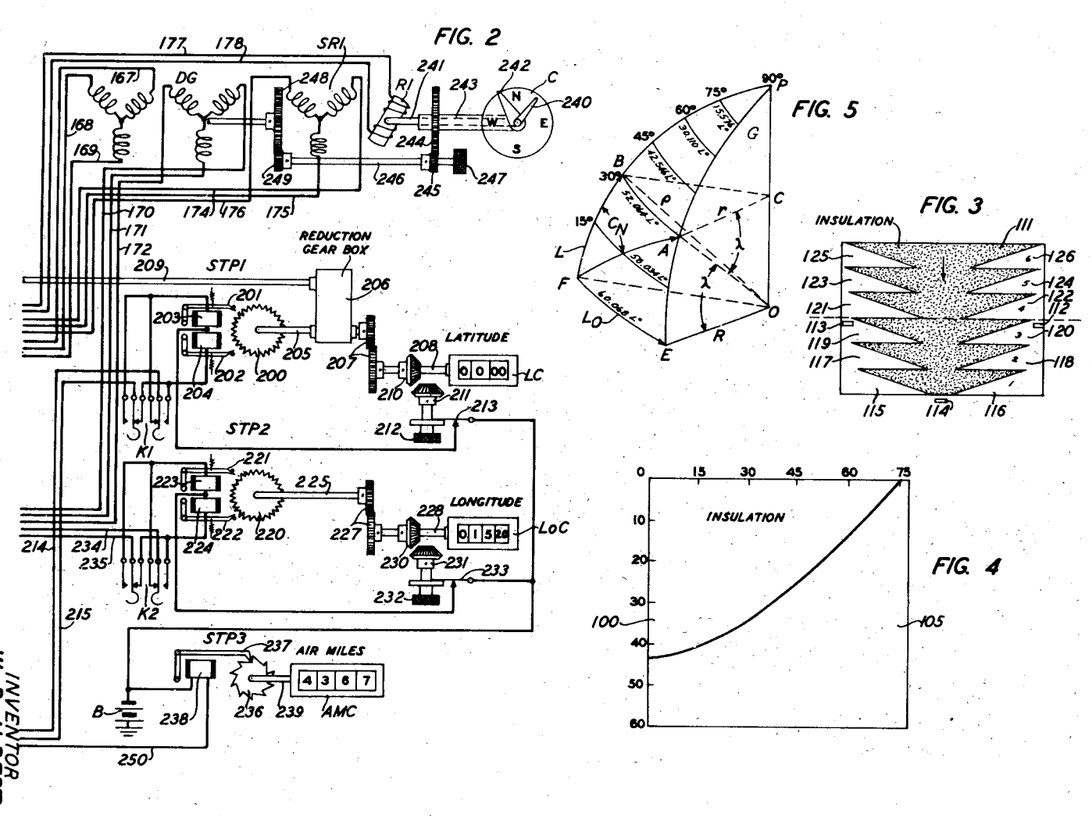
Fig. 2 shows schematically the apparatus and circuits of the air position indicator unit.
Fig. 3 shows a development of the circuit of the drum of either the latitude or longitude impulse generator.
Fig. 4 shows a development of the surface of the drum of the secant variator.
Fig. 5 is a vector diagram explanatory of the theoretical aspects of the invention.

The indicator disclosed in Fig. 2 includes two two-directional stepping devices STP1 and STP2 and a single directional stepping device STP3. The stepping devices STP1 and STP2 may be of any suitable type, for example, of the type disclosed in Patent No. 2,323,840, granted July 6, 1943, to T. Obszarny. The stepping device STP1 comprises a single ratchet wheel 200 with which two stepping pawls 201 and 202 cooperate. The pawl 201 is operable by the stepping magnet 203 to advance the ratchet wheel 200, for example, in a counterclockwise direction and the pawl 202 is operable by the stepping magnet 204 to advance the ratchet wheel 200 in the opposite direction. The ratchet wheel 200 of the stepping device STP1 is mounted upon the input shaft 205 of the reduction gear box 206 which is connected by the reduction gears 207 having a reduction ratio of 1½:1 to the input shaft 208 of the latitude counter LC. If it is assumed that the ratchet wheel 200 has forty teeth and is advanced one step for each minute change in latitude, then through the reduction gears 207, the input shaft 208 of the counter LC will be advanced one-sixtieth of a revolution and thus the input wheel of the counter, which is graduated 0 to 59 minutes, is rotated one revolution for each degree of latitude. The other wheels of the latitude counter are advanced by decimal Geneva movements in the usual manner to register the units and tens of the degrees of latitude.

Mounted on the output shaft 209 of the reduction gear box 206 is a pinion 101 which meshes with a rack 102. To the rack 102 is attached the movable brush 103 of the secant variator SV.

The input shaft 208 of the counter LC also carries a bevel gear 210 which may be meshed with the setting gear 211 when the setting knob 212 is pushed inwardly against the tension of spring 213. With the gears 210 and 211 meshed the rotation of the knob 212 is effective to set the counter LC at a definite fix or land mark the latitude of which is known. When the knob 212 is pushed in to reset the counter LC, the spring 213 disengages its normal contact to disconnect battery B from the windings of stepping magnets 203 and 204 so that such magnets are ineffective during the resetting operation.

When a flight is being conducted in the northern hemisphere, the stepping control conductors 214 and 215 are connected over the normal contacts of key K1 to the windings of magnet 203 and 204, respectively, of the stepping device STP1 so that the counter LC will increase its reading as the flight proceeds northward and will decrease its reading if the flight proceeds southward towards the equator. When the equator is crossed, a reading of 00 degrees 00 minutes would be followed by a reading of 99 degrees 59 minutes as the flight proceeds into the southern hemisphere. In order therefore that the counter may increase its reading through 00 degrees 01 minute, etc., the key K1 is provided which when depressed directs stepping impulses incoming over conductor 214 to magnet 204 rather than to magnet 203 and directs stepping impulses incoming over conductor 215 to magnet 203 rather than to magnet 204 whereby the navigator or pilot may reverse the rotation of the counter LC as the flight crosses the equator.

The stepping device STP2 is similarly provided with a ratchet wheel 220 which is operable in a counter-clockwise direction by the stepping pawl 221 under the control of stepping magnet 223 and and in a clockwise direction by the stepping pawl 222 under the control of the stepping magnet 224. The ratchet wheel is mounted on shaft 225 which is coupled by the reduction gears 227 which have a reduction gear ratio of 1½:1 to the input shaft 228 of the longitude counter LoC. The input shaft of the longitude counter is rotated through one revolution by sixty steps of the stepping device and thus rotates the input wheel of the counter, which is graduated 0 to 59 minutes, one revolution for each degree of longitude. The other wheels of the longitude counter are advanced by decimal Geneva movements in the usual manner to register the units, tens and hundreds of the degrees of longitude.

The input shaft 228 also carries a bevel gear 230 which may be meshed with the setting gear 231 when the setting knob 232 is pushed inwardly against the tension of spring 233. With the gears 230 and 231 meshed, the rotation of the knob 232 is effective to set the counter LoC at a definite fix or land mark, the longitude of which is known. When the knob 232 is pushed in to reset the counter LoC, the spring 233 disengages its normal contact to disconnect battery B from the windings of stepping magnets 223 and 224 so that such magnets are ineffective during the resetting operation.

When a flight is being conducted in the eastern hemisphere or east of the reference meridian, the stepping control conductors 234 and 235 are connected over the normal contacts of key K2 to the windings of magnet 223 and 224, respectively, of the stepping device STP2, so that the counter LoC will increase its reading as the flight proceeds eastward and will decrease its reading if the flight proceeds westward toward the reference meridian. This counter may read 00 degrees 00 minutes to 180 degrees 00 minutes. When the 180 degree reference meridian is crossed a reading of 180 degrees 00 minutes would be followed by 180 degrees 01 minute as the flight proceeds into the western hemisphere. In order therefore that the counter may decrease its reading through 179 degrees 59 minutes, etc., the key K2 is provided which when depressed directs stepping impulses incoming over conductor 234 to magnet 224 rather than to magnet 223 and directs stepping impulses incoming over conductor 235 to magnet 223 rather than to magnet 224 whereby the navigator or pilot may reverse the rotation of the counter as the flight crosses the reference meridians 0 and 180.

The ratchet wheel 236 of the stepping device STP3 is rotatable in but one direction through the operation of the stepping pawl 237 under the control of the stepping magnet 238. This ratchet wheel has ten teeth and is mounted on the input shaft 239 of the air miles indicator AMC, the input wheel of which is graduated 0 to 9 and moves step-by-step making one revolution per each ten nautical miles of flight. The other wheels of this counter are advanced by decimal Geneva movements in the usual manner to register the tens, hundreds and thousands of miles.

The compass indicator C is provided with a dial having a compass rose thereon, a compass pointer 240 driven by the shaft 241 connected to the rotor of the synchro-receiver SR1 for indicating the true compass course of the flight and a correction pointer 242 driven by the sleeve shaft 243 through the gear 244 and pinion 245 from the shaft 246 which is rotatable by the correction knob 247.

Figure 1:
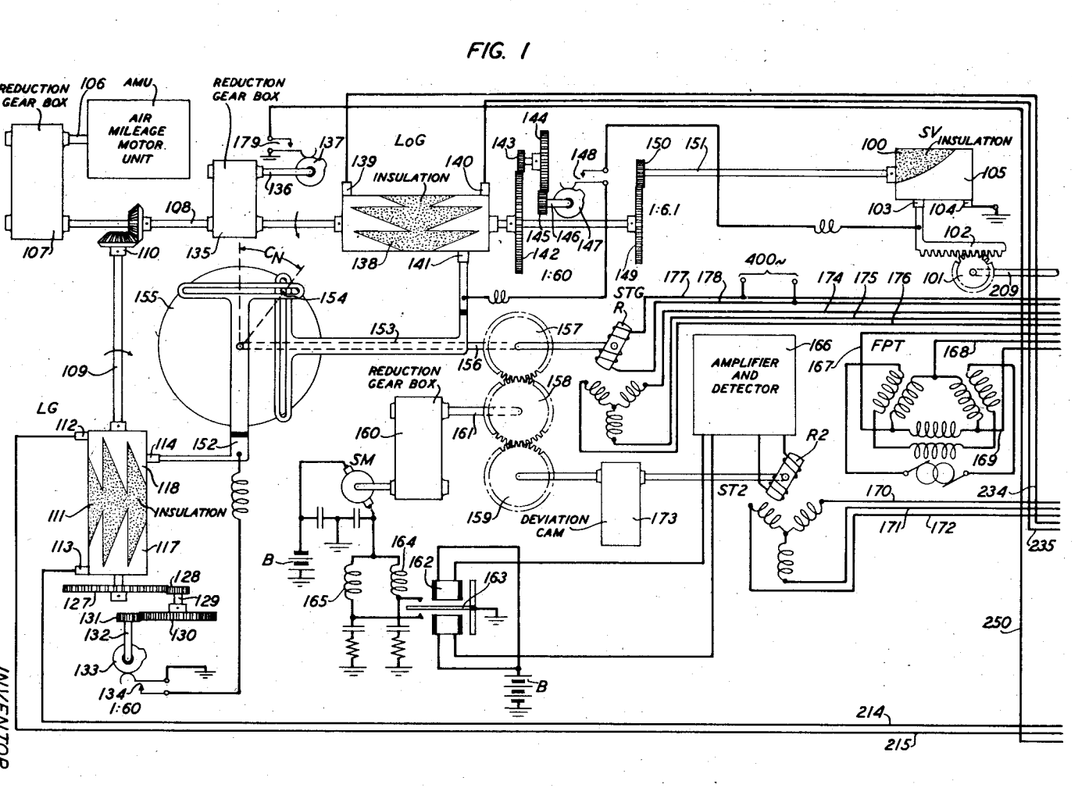
Fig. 1 shows the control apparatus of the air position indicator of the present invention and the manner in which it is controlled from the air mileage motor unit and the "flux gate" compass unit of an airplane.

The output shaft 106 of the air mileage unit AMU of the airplane is connected directly to the input of the reduction gear box 107 the output shaft of which gear box is connected to shaft 108. The shaft 108 drives the shaft 109 through unity ratio bevel gears 110. Mounted on the shaft 109 and driven thereby is the drum 111 of the latitude impulse generator LG with which two fixed brushes 112 and 113 and a movable brush 114 cooperate. The drum 111 may be molded from insulating material or have a surface of insulating material in which are embedded twelve triangularly-shaped conducting segments mounted in two circumferentially arranged series as best disclosed in Fig. 3, which figure shows a development of the surface of the drum 111. All of the segments have their leading edges positioned parallel to the axis of the drum and are of equal length.

It will be noted from Fig. 3 that the lowermost segments 115 and 116 are positioned in the surface of the drum 111 with their apices spaced apart only slightly more than the width of the brush 114 so that if the flight course is absolutely due north the brush 114 will be engaged by neither segment 115 nor 116 but will be engaged upon the slightest movement of the brush 114 indicative of a deviation to the east or west from a due north course of flight. If it be considered that the length of the leading edge of each segment is equal to sixty increments of movement of the brush 114 then the apices of the succeeding segments 118, 120, 122, 124 and 126 of the right-hand series of segments, as viewed in Fig.

3, are successively advanced toward the right end of the drum by the width of one such increment and similarly the apices of the succeeding segments 117, 119, 121, 123 and 125 of the left-hand series of segments are successively advanced toward the left end of the drum by the width of one such increment. Therefore, for example, if the brush 114 is advanced toward the right it will be engaged first by segment 116 and then as it moves a distance equal to one increment it will be engaged by both segments 116 and 118 during each revolution of the drum. If the brush is advanced a further increment it will be engaged by segments 116, 118 and 120 during each revolution of the drum and as the brush further advances, for example, to a distance equal to five increments it will be engaged by all of the segments of the right-hand series during each revolution. And, since the width of the segments increase toward the right, the duration of engagement of each segment with the brush 114 will increase as the brush moves toward the right.

The segments of each series are joined at their wide or outer ends to form a continuous slip ring, the fixed brush 112 engaging with the slip ring of the right-hand series of segments and the fixed brush 113 engaging with the slip ring of the left-hand series of segments.

The shaft 109 also has mounted thereon a gear 127 which meshes with a pinion 128 on a jack shaft 129, which latter shaft also carries the gear 130 which meshes with the gear 131 on the cam shaft 132. The gears 127, 128, 130 and 131 are so designed that the cam shaft 132 makes sixty revolutions for each revolution of the drum 111. The cam shaft 132 has a cam 133 secured thereto which once during each revolution causes the closure of the contact springs 134. The drum 111 is so geared to the air mileage unit AMU that it rotates in the direction indicated by the arrow in Fig. 1 so that as it rotates the leading edges of the conducting segments such as 118 approach the brush 114 and the geared connection of the cam 133 with the shaft 109 is so adjusted that the cam operated springs 134 always close just subsequent to the engagement of the leading edge of any drum segment with the brush 114. Since the drum segments may be made of base metal this arrangement insures that the impulse circuit which extends from the grounded terminal of the battery over the contact springs 134, over brush 114 and a segment of the drum 111, will always be made at the precious metal contacts of the springs 134, thus preventing arcing and pitting of the drum segments.

If the brush 114 is moved so that it is just barely engaged by the tip of a segment, such as 116, such engagement may not be of sufficient duration to enable the completion of an impulsing path from ground over the contacts of spring 134, brush 114, segment 116, brush 112, conductor 215, the left normal contacts of key K1 and to battery through the winding of stepping magnet 202 of the stepping device STP1. If, however, the brush 114 moves slightly more its engagement by segment 116 may be of such duration as to enable an impulse to be transmitted but the brush may not have been moved sufficiently to be engaged by the tip of segment 118 so that only one impulse would be transmitted during each revolution of the drum 111. As the brush 114 advances it may become engaged not only by segment 116 but by segment 118, but if it is engaged only by the tip of segment 118 the duration of the engagement may not be sufficient to cause the transmission of an impulse and consequently the only impulse per revolution would result from the engagement of segment 116 with brush 114 but, upon a slightly further advance of the brush 114, the duration of engagement of brush 114 with segment 118 would be increased to become coincident with the closure of contact springs 134 thereby resulting in the transmission of two impulses per revolution of the drum, one at the time of the engagement between brush 114 and segment 116 and the second at the time of engagement of brush 114 and segment 118. As the brush 114 advances further, additional impulses per revolution will be transmitted and when the brush has been advanced to a position such that circuit closures at the springs 134 coincide with the engagement between brush 114 and segments 120, 122, 124 and 126 six equally spaced impulses will be transmitted during each revolution of the drum. In this position of the brush 114 the trailing edge of the segment 116 will leave the brush 114 before the contact springs 134 will close a second time during the engagement of brush 114 with segment 116.

As the brush advances further to be engaged by a wider portion of the segment 114 two closures of the contact springs 134 will occur while the segment 116 is in engagement with the brush 114 and consequently a total of seven impulses will be transmitted during each revolution of the drum 111. In this manner as the brush moves further the number of impulses transmitted during each revolution will increase until when the brush has moved to the extreme of its movement it will be engaged by the widest portion of each of the segments and ten closures of the contact springs 134 will occur as each segment passes the brush 114 resulting in the transmission of sixty impulses during each revolution. It will be obvious that impulses varying from one to sixty would be transmitted in the same manner upon the movement of the brush 114 from its central position toward the bottom end of the drum 111 as viewed in Fig. 1, over a circuit extending from ground over the contact springs 134, brush 114, segments 115, 117, etc., brush 113, conductor 214, the right normal contacts of key K1 and to battery through stepping magnet 203 of stepping device STP1.

It therefore follows from the arrangement of the segments on the drum 111 that the closure of the interrupter contacts 134, counted 1 to 60, during each revolution of the drum will occur as the brush engages successive segments in the order 1—11—21—31—41—51 and impulses will be transmitted whereas the closure of the interrupter contacts 134 which occur while the brush engages between successive segments, as, for example, closures 2 to 10 inclusive, 12 to 20, inclusive, etc., will be ineffective and no impulses will be transmitted. This provides a more accurate counting or integrating of impulses than would be in the order 1—2—3—4—5—6. As the brush 114 moves slowly toward either end of the drum the number of effective impulses transmitted to actuate the stepping device during each revolution of the drum increases, impulses being transmitted, for example, during one revolution of the drum upon the interrupter closures 1—11—21—31—41—51 as above described, during the next revolution upon the interrupter closures 1—2—11—21—31—41—51, during the next revolution upon the interrupter closures 1—2—11—12—21—31—41—51, during the next revolution upon the interrupter closures 1—2—11—12—21—22—31—

41—51, etc., until when the brush has moved to the extreme end of the drum impulses will be sent upon each of the sixty closures occurring during a revolution of the drum.

Geared to the shaft 108 through the reduction gear box 135 is a cam shaft 136 upon which is secured the cam 137 for operating the contact springs 179. The ratios of the gear boxes 107 and 135 are such that the cam 137 is driven from the air mileage unit AMU at a speed to cause the closure of the contact springs 179 once for each nautical mile flown. Thus, since the output shaft 106 of the air mileage unit AMU makes 1440 revolutions per nautical mile, the sum of the step-down gear ratios of the gear boxes 107 and 135 should be 1440 to 1. The contact springs 179 serve to establish a stepping circuit from ground thereover and over conductor 250 through the winding of stepping magnet 238 of the stepping device STP3 and thence to battery and ground whereby the input shaft of the air miles counter is advanced one-tenth of a revolution upon each closure of the contact springs 179 to register one nautical air mile flown.

Secured to the shaft 108 is the drum 138 of the longitude impulse generator LoG. This drum is identical in construction to the drum 111 and has two fixed brushes 139 and 140 and a movable brush 141 cooperating therewith. The fixed brushes are connected over conductors 234 and 235, respectively, and over normal contacts of key K2 with the stepping magnets 223 and 224 of the stepping device STP2. Also secured to the shaft 108 is a gear 142 which, through gears 143, 144 and 145 drives the shaft 146 on which is mounted the cam 147. These gears are so chosen that the shaft 146 and cam 147 make sixty revolutions during each revolution of shaft 108 and drum 138 whereby the control springs 148 are closed sixty times during each revolution of the drum 138. The shaft 108 is rotated in the direction indicated by the arrow and the gear train between the shaft 108 and the cam shaft 146 is so adjusted that the contact springs 148 close just subsequent to the engagement of the leading edge of any conducting segment of the drum 138 with the brush 141.

Also secured to the shaft 108 is a gear 149 which meshes with gear 150 secured to shaft 151. Mounted on the shaft 151 is the drum 100 of the secant variator SV. The drum 100 may be made of insulating material or may have a surface of insulating material in which is embedded a single conducting segment 105 of the shape disclosed in Fig. 4, this figure showing a development of the surface of the drum. The curved edge of the segment 105 is developed in the following manner. Referring to Fig. 5, if it be assumed that the distance FE represents L degrees of longitude at the equator, it will be seen that an airplane flying from F to E along the equator would have to fly 60.068 nautical miles to fly 1 degree of longitude but if the airplane were to fly a course parallel to the equator at a point nearer the earth's pole fewer nautical miles per degree would have to be flown. For example, at 15 degrees latitude 58.034, at 30 degrees latitude 52.064, at 45 degrees latitude 42.546, at 60 degrees latitude 30.110 and at 75 degrees latitude 15.596 miles per degree would have to be flown. Since flight above 75 degrees latitude would not ordinarily be flown, values of miles per degree above 75 degrees latitude need not be taken into consideration.

The curved edge of the segment 105 is therefor determined by plotting the difference between the air miles per degree at different degrees of latitude and the miles per degree at 75 degrees latitude, measured down from the top edge of the development as viewed in Fig. 4, against the degrees of latitude. The movable brush 103, when positioned at the extreme left end of the drum 100 at the time the latitude is zero or at the equator, has the shortest duration of circuit closure with the segment 105 and when positioned at the right end of the drum or when the latitude is 75 degrees the duration of the circuit closure between the brush 103 and the segment 105 will be continuous. As previously described the brush 103 is moved under the control of the latitude stepping device STP1. Under the control of the secant variator SV and longitude impulse generator LoG, impulses are transmitted from ground over brush 104, segment 105 of variator SV, brush 103, cam-actuated contact springs 148, brush 141, segments on the drum 138 and thence over conductor 234 and over the right normal contacts of key K2 to battery through the winding of stepping magnet 223 of the stepping device STP2 or over conductor 235 and over the left normal contacts of key K2 to battery through the winding of stepping magnet 224 of the stepping device STP2 dependent upon whether the brush 141 engages with the left or right series of segments on the drum 138.

Thus the number of impulses delivered to the longitude stepping device STP2 through the operation of the secant variator SV and the longitude drum 138 in ratio to the maximum number for a given setting of the longitude brush 141 is the ratio of the metallic segment 105 of the variator to the insulated segment of the variator for the setting of the brush 103 of the variator. Also the coupling action of the variator with respect to the longitude drum provides an accurate method of averaging this ratio as applied to all segments of the drum 138.

The brushes 114 and 141 are connected to Scotch yokes 152 and 153, respectively, which are both operated by the crank pin 154 on disc 155 which disc is rotated by shaft 156 driven by gears 157 and 158 from the output shaft 161 of the reduction gear box 160. The input shaft of the gear box is driven by the compass servomotor SM. The shaft 156 is thus driven by the motor SM through a rotational angle corresponding to the angle of the true compass course of the flight and through the Scotch yoke 152 the brush 114 is advanced along the surface of the drum 111 a distance commensurate with the cosine of the true course angle and through the Scotch yoke 153 the brush 141 is advanced along the surface of the drum 138 a distance commensurate with the sine of the true course angle.

The servo-motor SM is of the direct current reversible split field series-connected type and is controlled by the three-position differential relay 162. The armature 163 of relay 162 may be operated into engagement with either its upper or its lower contact to establish a circuit through one or the other of the field windings 164 and 165 of the motor SM to cause the motor to run in one or the other direction under the control of the amplifier-detector 166 and thus under the control of the output of synchro-transformer ST2.

For controlling the amplifier-detector 166 and servo-motor SM the flux gate primary transmitter FPT is connected over conductors 167, 168 and 169 with the stator windings of the differential generator DG, the Y-connected rotor windings of which are connected over conductors 170, 171 and 172 with the corresponding stator windings of the synchro-transformer ST2. The rotor winding R2 of the synchro-transformer is connected to the input circuit of the amplifier-detector 166 and is rotatable through the unity ratio gears 158 and 159 and through the deviation cam 173, represented by the box so labeled, by the servo-motor SM. The rotor of the differential generator DG is rotatable by the setting knob 247 through the gears 248 and 249 to introduce a magnetic correction for the compass C. The gears 248 and 249 have the same gear ratio as the gears 244 and 245 so that the amount of rotation of the rotor windings of the generator DG is indicated by the correction pointer 242 of the compass C.

In order that the pilot may have an indication of the true course which he is flying the pointer 240 of the compass C is connected by shaft 241 as previously described to the rotor R1 of the synchro-receiver SR1, the stator windings of which are connected over conductors 174, 175 and 176 with the corresponding windings of the secondary transmitting generator STG. The rotor winding R of the generator STG is rotatable through the gears 157 and 158 by the servo-motor SM and the windings of rotors R and R1 are interconnected by conductors 177 and 178 and energized from the source of 400-cycle current of the airplane. The rotation of the rotor winding R of the secondary transmitting generator STG by the servo-motor SM is thus instrumental in rotating the compass pointer 240 with the magnetic correction introduced by the differential generator DG under the control of the setting knob 247 and the correction made by the deviation cam 173. With the differential generator DG interposed between the flux gate primary transmitter FPT and the synchro-transformer ST2, the rotor of transformer ST2 will, through the servo-motor SM and the amplifier-detector 166, follow the primary transmitter FPT but its position will differ by the magnetic correction angle introduced by the setting of the rotor windings of the differential generator DG as indicated by the correction pointer 242.

While the invention has been described in connection with its application to an airplane having a flux gate compass unit it is to be understood that it is also applicable to an airplane having a "magnesyn" type compass unit. If the airplane were equipped with the latter type of compass unit the servo-motor SM would be controlled in the manner fully disclosed in Fig. 1B of the application Serial No. 527,999 of W. H. T. Holden hereinbefore referred to.

The apparatus employed in embodying the invention having now been described, the manner in which the apparatus functions will be discussed. It will be assumed that the airplane in which the air position indicator is installed starts a flight from a position of 00 degrees 00 minutes latitude and 15 degrees 20 minutes longitude in the eastern and northern hemispheres. The pilot knows the latitude and longitude of the position of the take-off and therefore resets the latitude and longitude counters LC and LoC by the operation of the reset knobs 212 and 232 in the manner fully described so that they indicate the position as disclosed in Fig. 2. He also sees that keys K1 and K2 are in positions indicative of the flight to be made in the northern and eastern hemispheres. It will also be assumed that previous to the contemplated flight, the airplane has flown 4367 nautical air miles as indicated by the air miles counter AMC.

It will be assumed that a flight is made in the direction indicated by the line FA in Fig. 5 with a true compass course of $C_N$ degrees as indicated by the compass C, and at such a true air speed that the distance traveled at the time an observation is made may be indicated by the vector FA. The latitude component FB of vector FA is therefore FA cos $C_N$ and the distance BA or $\rho$ along the latitude parallel through the point A is therefore FA sin $C_N$. The air speed is measured by the air mileage unit AMU which drives the drums 111 and 133 at an angular velocity $\omega_0$ commensurate with the air speed or $\omega_0 = K_0 V_t$ when the true air speed is expressed as $V_t$. As the flight progresses from the point of take-off F along the vector direction FA, the cam 137 is driven through the gear boxes 107 and 135 to cause a closure of the contact springs 179 once per nautical mile of flight resulting in the closure of the circuit extending over conductor 250 and to battery through the winding of stepping magnet 238 of the stepping device STP3 of Fig. 2 to advance the air miles counter AMC step by step. The pilot noting the reading of the counter at any time and by subtracting therefrom the initial reading may ascertain the number of air miles flown.

If desired, the counter AMC could be provided with a means for resetting it to zero similar, for example, to the resetting knob 212 and resetting gears 210 and 211 associated with the latitude counter LC so that the air miles flown on any flight could be ascertained directly from the counter without the necessity of making a calculation.

The drum 111 is driven from the air mileage unit at a rotational speed which is commensurate with the true air speed and during each rotation of the drum, the cam 133 causes sixty closures of the contact springs 134. In response to the operation of the flux gate primary transmitter FPT, the synchro-transformer ST2 and the amplifier-detector 166, the differential relay 162 is operated causing it to move its armature 163 into engagement with one or the other of the associated contacts thereby causing the establishment of a circuit from ground through one or the other of the field windings of servo-motor SM, through the armature winding of the motor and to battery B.

The motor SM is thereupon operated and through the reduction gear box 169 rotates the shaft 161 until, through the gears 158 and 159, the rotor R2 of the synchro-transformer ST2 is so positioned that it receives no potential and the output of the amplifier-detector 166 is thereupon reduced to zero and relay 162 will therefore receive no current. At that time the armature 163 of relay 162 will assume its mid-position thereby opening the circuit of motor SM.

Shaft 156 has now, through the gears 158 and 157, been rotated to assume an angular position corresponding to the true course angle $C_N$ and through the disc 155 and crank pin 154 has moved the Scotch yoke 152 to advance the brush 114 in one or the other direction along the surface of the drum to be engaged by the conducting segments of the drum as it rotates. As previously described, as the brush 114 moves in one direction towards the upper end of the drum, the number of impulses transmitted over conductor 215 will increase and such increase will vary in accordance with the cosine of the angle of the true course flight, or if the brush moves in the other direction towards the lower end of the drum, the number of impulses transmitted over conductor 214 will similarly increase. When the crank pin 154 is vertically above the center of the disc 155, the true flight angle $C_N$ is zero and, consequently, the flight course would be due north and the cosine of the true flight course angle would have a maximum value. Therefore, in this position of the crank pin, the brush 114 will be at the upper end of the drum 111 and impulses at the maximum rate per revolution of the drum will be transmitted to the magnet 204 of the stepping device STP1 thereby causing the advance of the input wheel of the counter LC.

It has been assumed, however, that the true flight course is in the vector direction FA, as illustrated in Fig. 5, and the course angle is $C_N$ and that therefore the crank pin 154 has been rotated through the angle $C_N$ to the position illustrated in Fig. 1, thereby moving the brush 114 to the position illustrated. As a consequence the stepping device STP1 advances the latitude counter LC at a rate commensurate with the air speed AS and the change in the angle $C_N$ of the flight course with respect to north. By reference to the vector diagram of Fig. 5 it will be seen that the vector FB has the value of FA cos $C_N$ but since $FA=AS_t$, then $FB=AS_t$ cos $C_N$ or $L=AS_t$ cos $C_N$. The counter LC is thus operated at such a speed that at any instant it indicates the value of vector FB or the degrees of latitude.

At the same time the drum 138 has also been rotated at a speed commensurate with the true air speed AS and by the Scotch yoke 153 the brush 141 has been advanced toward the right end of the drum 138 so that the number of impulses generated through the closure of the cam operated contacts 148 and the engagement of segments of the drum 138 with the brush 141, will be in accordance with the air speed and also in accordance with the sine of the flight course angle $C_N$, and may be expressed as AS sin $C_N$. With the brush in the position illustrated impulses are transmitted over conductor 235 and through magnet 224 of stepping device STP2 whereby the longitude counter LoC is advanced in a positive direction indicative of an eastward flight.

It is to be noted that when the crank pin 154 moves to a position exactly to the right of the center of disc 155 at which position the angle $C_N$ is 90 degrees, it moves the brush 141 to the extreme right end of the drum 138 in which position the maximum number of impulses are generated by the cam operated contacts 148 and drum segments for each revolution of the drum indicative of a due east flight course.

It is a well-known rule of geography that the change in longitude equivalent to a given departure varies in accordance with the secant of the average latitude angle. The basis for this assertion will be apparent from the following discussion considered in connection with the diagram of Fig. 5. It will be assumed that the longitude of point A with respect to point F is to be determined. BA and FE are similar arcs of two circles and are proportional to the radii of such circles. Therefore if BA be designated $\rho$ and FE be designated Lo or the longitude of the point A, then $$\frac{BA}{FE}=\frac{\rho}{Lo}=\frac{r}{R} \text{ or}$$

$$\rho=\frac{rLo}{R} \quad (1)$$

Now the latitude of point A is the angle BOF which is equal to the angle AOE, but angle AOE is equal to the angle OAC of the right angle triangle OAC. If now the angle OAC be designated $\lambda$ we have in the triangle OAC, $$AC=AO \cos \lambda \text{ or}$$

$$\cos \lambda=\frac{AC}{AO}=\frac{r}{R} \quad (2)$$

Substituting Equation 2 in Equation 1 we have $$\rho=Lo \cos \lambda \text{ or}$$

$$Lo=\frac{\rho}{\cos \lambda} \text{ or}$$

$$Lo=\rho \text{ secant } \lambda$$

$\lambda$ is the latitude angle so it follows that $$Lo=\frac{\rho}{\cos \lambda}=\rho \text{ secant } L \quad (3)$$

Now $\rho=FA \sin C_N$ but since as previously stated $FA=AS_t$ then $\rho=AS_t \sin CN$ and as the drum 138 rotates at a speed commensurate with the air speed, the impulses generated by the rotation of the drum and the operation of the cam operated contacts 148 will be in accordance with the value of $\rho$. Now to convert this impulse value of $\rho$ into the true longitude, the variator SV is provided.

The brush 103 of this variator is advanced along the drum 100 in accordance with the change in the value of the latitude angle $\lambda$, being positioned at the extreme left end of the drum when the latitude angle is zero and the extreme right end when the latitude angle is 75 degrees. A flight would not be conducted nearer either of the earth's poles than 75 degrees north or south so that values of the latitude angle greater than 75 degrees need not be considered. The secant of the angle L will vary from one to infinity as L increases from 0 to 90 degrees and therefore Lo will vary from the value $\rho$ to infinity as the latitude angle increases from 0 to 90 degrees.

From the foregoing, it will be apparent that theoretically the rate at which stepping impulses should be transmitted to the stepping device STP2, should be varied from a stepping rate which would advance the longitude counter one degree for every 60.068 air miles flown eastward at the equator to an infinite stepping rate at the poles. This variation in the stepping rate is made by the secant variator SV; the width of the segment 105 of which follows the secant function of the angle of latitude $\lambda$ whereby when the angle of latitude is zero and the brush 103 is positioned at the left end of the drum 100, the number of impulses which will be transmitted during each revolution of the drum 138 will be zero since at the same time the brush 141 will be positioned on the drum 138 so that no segment of the drum will engage it as the drum rotates. As the angle $C_N$ increases slightly from 0 so that the brush 141 is engaged by one segment during each revolution of the drum, the brush 103 will still be positioned near the left end of drum 100 and since the drum 100 due to the step-up gear ratio 1 to 6.1 makes about 1 revolution during the passage of each segment of drum 138 past the brush 141, only one or two impulses will be transmitted to the stepping device STP2 to advance the counter LoC during each revolution of drum 138.

As the flight progresses from the point F toward the point A, the value of $\rho$ will increase and the value of the latitude angle L will increase and consequently the brush 141 will move toward the right end of the drum 138 to an amount commensurate with the change of value of ρ or AS$_t$ sin C$_N$ and the brush 103 will move toward the right end of drum 100 to an amount commensurate with the change in the value of the latitude angle λ or the latitude L and the duration of the engagement of brush 103 with the segment 105 of drum 100 will vary in accordance with the change in the function (secant L). Thus when the flight reaches the point A at which the airplane would be required to fly in an eastward direction 52.064 nautical miles for each degree of longitude, the brushes 141 and 103 will be positioned as indicated in Fig. 1. With brush 103 thus positioned it will be engaged by the segment 105 during each revolution while the brush 141 is being engaged by three of the segments of drum 138 and consequently a number of impulses will be transmitted to advance the counter LoC which is commensurate with the function ρ secant L or impulses generated by the position of brush 141 with respect to the drum 138 as modified by the position of brush 103 on the segment 105.

If the flight course had been flown from point F to point G, the value of ρ would further decrease and the value of the latitude angle L would increase from 0 to 75 degrees and consequently the brush 141 would have moved nearly to the extreme right end of the drum 138 to an amount commensurate with the value of ρ or AS$_t$ sin C$_N$ and the brush 103 would have moved to the extreme right end of drum 100 commensurate with the latitude angle λ or the latitude L and the engagement of brush 103 with the segment 105 of drum 100 would have lasted during each entire revolution of drum 100 and while the drum 138 and associated contact springs 148 were generating a number of impulses per revolution of drum 138 somewhat less than sixty impulses per revolution. Thus a larger number of impulses would have been transmitted to the stepping device STP2 during the time that the flight is proceeding from A to G. It will thus be apparent that the nearer the pole the flight proceeds, the faster will be the stepping speed of the stepping device STP2.

While the functioning of the invention for a north eastward flight has been discussed, it is believed that its operation on a flight southward above the equator and in the east hemisphere will be apparent. On a flight into the western hemisphere either after flying eastwardly across the 180-degree reference meridian or westerly across the 0-degree reference meridian the pilot will operate the key K2 when the flight crosses either reference meridian. On a flight eastward of the reference meridian but south of the equator, he will operate the key K1 when the equator is crossed and on a flight in the southern hemisphere but westward, from the 0-degree reference meridian or eastwardly across the 180-degree reference meridian, he will also operate key K2 when the reference meridians are crossed. Conversely, if a flight is conducted from the western hemisphere easterly across the 0-degree reference meridian or westerly across the 180-degree reference meridian into the eastern hemisphere, the pilot will restore the key K2 to its normal position.

What is claimed is:

1. In an automatic dead-reckoning device for a craft, a latitude indicator, a drum, means for rotating said drum at a speed commensurate with the speed of travel of said craft, two groups of conducting segments extending respectively from the central portion of said drum axially toward the ends of said drum and insulatedly mounted on said drum with the apices of the segments of one group positioned spirally around said drum and with the apices of the segments of the other group positioned along a reversed spiral around said drum whereby the apices of successive corresponding segments of said groups are axially spaced at equally increasing distances from each other, a brush engageable with either group of said segments and movable axially along the surface of said drum in accordance with the cosine of the true course angle of the travel of said craft to cause the generation of a varying number of impulses during each revolution of said drum, and a two-way stepping device responsive to impulses generated by the engagement of said brush with one or the other of said groups of segments for operating said latitude indicator in one or the other direction.

2. In an automatic dead-reckoning device for a craft, a latitude indicator, a drum, means for rotating said drum at a speed commensurate with the speed of travel of said craft, a plurality of substantially similar tapering conducting segments insulatedly mounted on the surface of said drum with their apices positioned spirally around said drum and their widest portions positioned adjacent to one end of said drum, a brush engageable with said segments and movable axially along the surface of said drum in accordance with the cosine of the true course angle of the travel of said craft whereby said brush is engaged by varying numbers of said segments and for varying durations during each revolution of said drum, an interrupter driven by said drum and operable to render said brush effective a plurality of times during each revolution of said drum, a stepping device for operating said latitude indicator and an operating circuit for said stepping device controlled jointly by said interrupter and by the engagement of said brush with the segments of said drum.

3. In an automatic dead-reckoning device for a craft, a longitude indicator, an impulse generator, means for driving said generator at a speed commensurate with the speed of travel of said craft, means for varying the number of impulses generated during each revolution of said generator in accordance with the sine of the true course angle of the travel of said craft, means for further varying the number of impulses transmitted from said generator in accordance with the secant of the angle of latitude of the course of said craft, and a stepping device responsive to said generated impulses as thus transmitted for operating said longitude indicator.

4. In an automatic dead-reckoning device for a craft, a longitude indicator, a drum, means for rotating said drum at a speed commensurate with the speed of travel of said craft, two groups of conducting segments extending respectively from the central portion of said drum axially toward the end of said drum and insulatedly mounted on said drum with the apices of the segments of one group positioned spirally around said drum and with the apices of the segments of the other group positioned along a reverse spiral around said drum whereby the apices of successive corresponding segments of said groups are axially spaced at equally increasing distances from each other, a brush engageable with either group of said segments and movable axially along the surface of said drum in accordance with the sine of the true course angle of the travel of said craft to enable the generation of a varying number of impulses during each revolution of said drum, means for further varying the number of said impulses in accordance with the secant of the angle of latitude of the course of said craft, and a two-way stepping device responsive to the impulses generated by the engagement of said brush with one or the other of said groups of segments and as further modified by said latter means for operating said longitude indicator in one or the other direction.

5. In an automatic dead-reckoning device for a craft, a longitude indicator, a drum, means for rotating said drum at a speed commensurate with the speed of travel of said craft, a plurality of substantially similar tapering conducting segments insulatedly mounted on the surface of said drum with their apices positioned spirally around said drum and their widest portions positioned adjacent to one end of said drum, a brush engageable with said segments and movable axially along the surface of said drum in accordance with the sine of the true course angle of the travel of said craft whereby said brush is engaged by varying members of said segments and for varying durations during each revolution of said drum, an interrupter driven by said drum and operable to render said brush effective a plurality of times during each revolution of said drum, means for further rendering said brush effective for intervals varying in accordance with the secant of the latitude of the course of said craft, a stepping device for operating said longitude indicator, and an operating circuit for said stepping device controlled jointly by said interrupter, by said latter means and by the engagement of said brush with the segments of said drum.

6. In an automatic dead-reckoning device for a craft, a longitude indicator, a drum, means for rotating said drum at a speed commensurate with the speed of travel of said craft, a plurality of conducting segments extending axially along the surface of said drum and insulatedly mounted thereon with their apices positioned spirally around said drum, a brush engageable with said segments and movable axially along the surface of said drum in accordance with the sine of the sourse angle of the travel of said shaft to enable the generation of a varying number of impulses during each revolution of said drum, a second drum driven from the shaft of said first drum at a speed greater than the speed of said first drum, a conducting segment on said latter drum contoured in accordance with a secant function, a brush movable axially over the surface of said second drum in accordance with the latitude of the course of said craft whereby the circuit closure between said drum segment and said brush is caused to vary in accordance with the secant of the latitude, a stepping device for operating said longitude indicator, and a circuit for said stepping device jointly controlled by the engagement of the brushes with the segments of their respective drums whereby said longitude indicator is advanced at a rate determined by the course angle modified by the sine of the course speed and further modified by the secant of the angle of latitude.

7. In an automatic dead-reckoning device for a craft, a longitude indicator, a drum, means for rotating said drum at a speed commensurate with the speed of travel of said craft, a plurality of identical tapering conductive segments insulatedly mounted on the surface of said drum with their apices positioned spirally around said drum and their widest portions positioned adjacent to one end of said drum, a brush engageable with said segments and movable axially along the surface of said drum in accordance with the sine of the true course angle of the travel of said craft whereby said brush is engaged by varying numbers of said segments and for varying durations during each revolution of said drum, an interrupter driven by said drum and operable to render said brush effective a plurality of times during each revolution of said drum, a second drum driven from the shaft of said first drum at a speed such that said drum makes substantially as many revolutions during one revolution of said first drum as there are segments on said first drum, a conducting segment on said second drum contoured in accordance with a secant function, a brush movable axially over the surface of said second drum in accordance with the latitude of the course of said craft whereby the circuit closure between said drum segment and said brush is caused to vary in accordance with the secant of the latitude, a stepping device for operating said longitude indicator, and a circuit for said stepping device jointly controlled by the engagement of the brushes with the segments of their respective drums and by said interrupter whereby said longitude indicator is advanced at a rate determined by the course speed modified by the sine of the course angle and further modified by the secant of the angle of latitude.

WALTER P. ALBERT.

REFERENCES CITED

The following references are of record in the file of this patent:

UNITED STATES PATENTS

| Number | Name | Date |
| --- | --- | --- |
| 1,101,128 | Jensen et al. | June 23, 1914 |
| 1,704,250 | Holmes | Mar. 5, 1929 |
| 1,802,963 | Young | Apr. 28, 1931 |
| 1,976,617 | Lake et al. | Oct. 9, 1934 |
| 2,022,275 | Davis | Nov. 26, 1935 |
| 2,073,246 | Merrick | Mar. 9, 1937 |

FOREIGN PATENTS

| Number | Country | Date |
| --- | --- | --- |
| 244,013 | Germany | June 3, 1909 |